United States Patent Office 3,328,429
Patented June 27, 1967

3,328,429
PURIFICATION OF CRUDE PHTHALIC ANHYDRIDE
Siegfried Meinstein, Oak Lawn, and Charles F. Fuchs, Evanston, Ill., assignors to Witco Chemical Company, Inc., New York, N.Y., a corporation of Delaware
No Drawing. Filed July 6, 1965, Ser. No. 469,857
8 Claims. (Cl. 260—346.7)

Our invention relates to the purification of crude phthalic anhydride and it is especially concerned with an improved method for the purification of crude phthalic anhydride derived from the vapor phase oxidation of ortho-xylene.

Numerous methods have been suggested, and various of them have been commercially employed, for purifying crude phthalic anhydride. These prior methods include, by way of illustration, refluxing the crude phthalic anhydride with small amounts of ammonium acid sulfate or with lithium nitrate or with sodium bisulfite at elevated temperatures. Another of such known procedures involves a two step operation in which, in the first step, the crude phthalic anhydride, whether produced by oxidation of naphthalene or ortho-xylene, is treated with an oxidizing agent, such as sulfuric acid or hydrogen peroxide, at temperatures above 270 degrees C., and in which, in the second step, is treated with an alkali metal nitrate, also at temperatures above 270 degrees C. Such procedures, while reasonably effective, generally speaking, possess one or more of a number of disadvantages or combinations of disadvantages, in relation to the overall quality of the refined or purified phthalic anhydride obtained, amounts of tarry formation products, and yields of the refined or purified phthalic anhydride.

Our invention, particularly when carried out under optimum conditions, results in significant improvements with respect to overcoming one or more of the foregoing deficiencies of heretofore known procedures for purification of crude phthalic anhydride. Our invention is particularly important in connection with the purification of crude phthalic anhydride derived from the vapor phase oxidation of ortho-xylene. Illustrative crude phthalic anhydrides prepared by the vapor phase oxidation of ortho-xylene in the presence of typical oxidation catalysts have the following analyses:

| | Sample A, Weight Percent | Sample B, Weight Percent |
|---|---|---|
| Phthalic Anhydride | 97.2 | 95.3 |
| Maleic Anhydride | 0.96 | 1.12 |
| Citraconic Acid | 0.23 | 0.26 |
| Benzoic Acid | 0.05 | 0.10 |
| Toluic Acid | | 0.04 |
| Phthalide | 0.34 | 2.74 |
| O-tolualdehyde | Trace | 0.26 |
| Benzaldehyde | 0.03 | 0.01 |
| Unidentified Non-Acid Materials | | 0.18 |

Such crude phthalic anhydrides have been found to be much more refractory to purification procedures than crude phthalic anhydrides produced by the vapor phase oxidation of naphthalene. This is presumably due to the presence in the ortho-xylene derived crude phthalic anhydride of certain types of impurities, and/or proportions thereof, which are not present in crude phthalic anhydrides derived from naphthalene sources. The present invention, therefore, has its most significant value in the purification of crude phthalic anhydride prepared from ortho-xylene. It is also of marked advantage in the purification of crude phthalic anhydrides prepared by the vapor phase oxidation of mixtures of ortho-xylene and naphthalene, particularly where the ortho-xylene content of said mixtures is of the order of at least 25%, by weight, and, better still, of the order of 50% or more of ortho-xylene. The invention, to be sure, is also applicable to the purification of crude phthalic anhydride derived from other sources, such as the oxidation or vapor phase oxidation of naphthalene alone, but it is of lesser advantage as to such phthalic anhydride crudes because other presently known methods of purifying naphthalene derived phthalic anhydride produce reasonably satisfactory purified products. However, as indicated, in the broader aspects of our invention, our novel method of purification is applicable to the treatment of crude phthalic anhydride (which also includes so-called semi-refined phthalic anhydride) independently of the manner in which the same may have been produced.

Briefly stated, our method of refining or purifying crude phthalic anhydride comprises providing a mixture of the crude phthalic anhydride, in molten form, with small proportions of a borohydride, as pointed out below, and heating said mixture for several hours at elevated temperatures, generally above 270 degrees C. but not substantially in excess of the boiling point of phthalic anhydride at atmospheric pressure. The refined or purified phthalic anhydride is recovered by distillation from the mixture under a pressure below atmospheric pressure or, in other words, by fractional distillation under conditions of vacuum or sub-atmospheric pressure. In certain instances, it has been found to be particularly advantageous to utilize the borohydride in conjunction with small proportions of at least one member selected from the group consisting of alkali and alkaline earth metal hydroxides, carbonates and bicarbonates.

The borohydrides whose use is contemplated pursuant to the present invention are the alkali metal, alkaline earth metal and quaternary ammonium borohydrides, which may be represented by the formula $$M(BH_4)_w$$

where M is an alkali metal or an alkaline earth metal or a quaternary ammonium radical, $w$ being 1 when M is an alkali metal or a quaternary ammonium radical and $w$ being 2 when M is an alkaline earth metal. Among said borohydrides are, therefore, those of sodium, potassium, lithium, calcium, barium, magnesium, strontium, tetramethylammonium, tetraethylammonium, tetrapropylammonium and the like. Where M is a quaternary ammonium radical, it can be illustrated by the formula $$(R_4)\equiv N$$

where R are the same or different hydrocarbon radicals, generally of low molecular weight, such as methyl, ethyl, propyl, isopropyl, butyl, isobutyl, cyclohexyl, etc.

We have also found that, in place of the aforesaid borohydrides, alkali metal hydrides and, also, alkaline earth metal hydrides can be employed although their use is less desirable because, among other things, they are difficult to handle in plant scale operations.

Of the aforesaid borohydrides, sodium borohydride is especially satisfactory. The proportions of the borohydrides employed are, in all cases, quite small being, at least in part, dependent upon the selection of the particular borohydride and the content and nature of the impurities present in the crude phthalic anhydride to be treated. In general, the proportions of the borohydrides should be appreciably below 1% based on the weight of the crude phthalic anhydride, and will generally be below 0.5%, usually in the range of 0.01% to 0.5%. In the case of sodium borohydride, the optimum proportions, in the usual case, will be found to be in the range of substantially 0.02% to 0.1%.

Where alkali metal hydrides or alkaline earth metal hydrides are employed, the percentages thereof will generally be of the same order as in the case of the borohydrides. Among the aforesaid hydrides are sodium hydride, potassium hydride, lithium hydride, calcium hydride, barium hydride, and magnesium hydride, calcium hydride being preferred among the hydrides. It will be understood, of course, that mixtures of the aforesaid borohydrides and hydrides, with or without the aforementioned alkaline materials, can be utilized.

In those instances in which the borohydrides (and/or hydrides) are used, pursuant to the present invention, in conjunction with alkali metal or alkaline earth metal hydroxides, carbonates or bicarbonates, illustrative examples of which are sodium hydroxide, potassium hydroxide, lithium hydroxide, sodium carbonate, potassium carbonate, lithium carbonate, sodium bicarbonate, calcium hydroxide, magnesium hydroxide, calcium carbonate and magnesium carbonate, and mixtures of two or more thereof, the proportions of said hydroxides, carbonates and bicarbonates utilized will also, in all cases, be quite small. In the usual case, the proportions thereof will fall within the range of about 0.01% to about 0.5% by weight of the crude phthalic anhydride. In the case of sodium carbonate, the optimum proportions will usually be found to lie within the range of 0.015% to 0.03% with a good average being substantially 0.02%, particularly where the sodium carbonate is used in conjunction with sodium borohydride.

The temperature of treatment, as stated previously, is, generally speaking, above 270 degrees C. and advantageously at about the boiling point of phthalic anhydride at atmospheric pressure which is approximately 285 degrees C. The treatment time, as stated, is several hours, with an optimum time, in the usual case, where the temperature utilized is about 285 degrees C., of about 8 to 10 hours. Generally speaking, for best results the treatment time should be more than 5 hours and ordinarily should not exceed 12 hours. A range of about 7 to 10 hours will usually be found to be very satisfactory. The treatment will, in general, be conducted under reflux.

The following tables show the results of typical examples of the practice of the present invention, it being understood that said examples are illustrative of and not limitative of the present invention. In all instances, except as specifically stated, the examples were carried out by utilizing 1000 g. of the crude phthalic anhydride, with recycled forecut and residue from previous distillations having been added as specifically indicated (the forecut being added prior to, and the residue after, the heat treatment), the crude phthalic anhydride being provided in molten form at a temperature of 140 degrees C. to 150 degrees C., the sodium borohydride employed being an aqueous solution containing 12% by weight of sodium borohydride, said solution being injected into said molten crude phthalic anhydride beneath the surface thereof. The mixtures were heated for 10 hours, except as otherwise noted, at a tempertaure of 285 degrees C. under reflux. Distillations were carried out under vacuum, forecut being collected at 95 mm.–100 mm. with a 15/1 reflux ratio and heart-cut at 75 mm.–80 mm. with a 3/1 reflux ratio, the still flask temperature being maintained at 215 degrees C. to 220 degrees C.

TABLE I.—REFINING OF 50/50 MIXTURES OF CRUDE PAA FROM ORTHO-XYLENE AND NAPHTHALENE CONVERSIONS

| Treating Additive | Percent Recycled | | Quality of Refined PAA | | | | Percent Yield | | |
|---|---|---|---|---|---|---|---|---|---|
| | Forecut | Residue | Color | Heat Stability | S.P. (° C.) | T.A. (percent) | Forecut | Heartcut | Residue |
| 1. 0.02 NaBH₄ | | | 10 | 40 | 131.1 | 99.8 | 14 | 80 | 6 |
| 2. 0.02 NaBH₄ | 8.0 | 8.0 | 10 | 20 | 131.0 | 99.9 | 6 | 90 | 4 |
| 3. 0.02 NaBH₄ | 6.8 | 4.0 | 10 | 20 | 131.0 | 99.9 | 6 | 91 | 3 |
| 4. 0.02 NaBH₄ | 6.0 | 3.0 | 10 | 15 | 131.1 | 99.9 | 11 | 81 | 8 |
| 5. 0.02 NaBH₄ | | | 10 | 30 | 131.2 | 99.9 | 6 | 86 | 8 |
| 6. 0.02 NaBH₄ | | | 10 | 25 | 131.2 | 99.8 | 5 | 87 | 8 |
| 7. 0.02 NaBH₄ | 6.0 | 8.0 | 10 | 25 | 131.0 | 99.8 | 8 | 87 | 5 |
| 8. 0.02 NaBH₄ | 7.0 | 5.0 | 10 | 15 | 131.0 | 99.9 | 8 | 88 | 4 |
| 9. 0.02 NaBH₄ | 8.0 | 4.0 | 10 | 20 | 130.9 | 99.8 | 7 | 90 | 3 |
| 10. 0.02 NaBH₄ | | | 10 | 10 | 131.1 | 99.8 | 6.5 | 88 | 5.5 |
| 11. 0.02 NaBH₄ | 6.5 | 5.5 | 10 | 10 | 131.2 | 99.9 | 7 | 89 | 4 |
| 12. 0.08 CaH₂ | | | 10 | 10 | 131.2 | 99.9 | 7 | 86 | 4 |

Note.—Near end of distillations, some residue decomposition and carry over addition of 0.02% K₂CO₃ to runs 10 and 11 prevented this.

TABLE II.—PURIFICATION OF 100% ORTHO-XYLENE DERIVED CRUDE PHTHALIC ANHYDRIDE (PAA)

| Treating Additive | Treating Time (hrs.) | Quality of Refined PAA | | | | Percent Yield | | |
|---|---|---|---|---|---|---|---|---|
| | | Color | Heat Stability | S.P. (° C.) | T.A. (percent) | Forecut | Heartcut | Residue |
| 1. None [1] | 10 | 10 | 100 | 131.0 | 99.9 | 5.0 | 90.0 | 5.0 |
| 2. None [1] | 10 | 10 | 70 | 131.0 | 99.9 | 7.0 | 89.0 | 4.0 |
| 3. 0.02% NaBH₄ and 0.02% Na₂CO₃ [1] | 10 | 10 | 10 | 131.1 | 99.9 | 8.0 | 87.0 | 5.0 |
| 4. 0.02% NaBH₄ and 0.02% Na₂CO₃ | 10 | 10 | 10 | 131.1 | 100 | 5.0 | 88.0 | 7.0 |
| 5. 0.02% NaBH₄ and 0.02% Na₂CO₃ | 10 | 10 | 10 | 131.1 | 100 | 5.0 | 89.0 | 6.0 |
| 6. 0.04% Na₂CO₃ only | 10 | 10 | 20 | 131.2 | 99.7 | 5.0 | 91.0 | 4.0 |

[1] Neither recycle forecut nor previous residue was used; in all other cases, such fractions were employed.

TABLE III.—REFINING OF CRUDE PAA PRODUCED FROM ORTHO-XYLENE

| Treating Additives | Percent Crude PAA from Naphthalene Conversion Added | Quality of Refined PAA | | | | Percent Yield | | |
|---|---|---|---|---|---|---|---|---|
| | | Color | Heat Stability | S.P. (° C.) | T.A. (percent) | Forecut | Heartcut | Residue |
| 1. None | 50 | 10 | 50 | 130.9 | 99.9 | 4.0 | 85.0 | 11.0 |
| 2. None | 50 | 10 | 40 | 130.9 | 99.9 | 7.0 | 78.0 | 15.0 |
| 3. 0.02% NaBH₄ and 0.02% Na₂CO₃ [1] | 50 | 10 | 20 | 131.0 | 99.9 | 7.0 | 85.0 | 8.0 |
| 4. 0.02% NaBH₄ and 0.02% Na₂CO₃ [1] | 50 | 10 | 40 | 130.9 | 99.9 | 7.0 | 83.0 | 10.0 |
| 5. 0.02% NaBH₄ and 0.02% Na₂CO₃ [1] | 50 | 10 | 20 | 130.8 | 99.9 | 7.0 | 85.0 | 8.0 |
| 6. 0.02% NaBH₄ and 0.02% Na₂CO₃ [1] | None | 10 | 10 | 131.0 | 99.9 | 6.0 | 88.0 | 6.0 |
| 7. 0.02% NaBH₄ and 0.02% Na₂CO₃ [1] | None | 10 | 10 | 131.2 | 99.9 | 6.0 | 88.0 | 6.0 |
| 8. 0.02% NaBH₄ and 0.02% Na₂CO₃ [2] | 50 | 10 | 10 | 131.0 | 99.9 | 6.0 | 88.0 | 6.0 |
| 9. 0.02% NaBH₄ and 0.02% Na₂CO₃ [1] | 50 | 10 | 15 | 131.0 | 99.9 | 7.0 | 85.0 | 8.0 |

[1] Samples did not contain recycled forecut, nor residues from previous distillations; all others did contain these.
[2] Treating time at 285° C. was 8 hours; all others were treated for 10 hours.

The practice of the method of the present invention enables the production of high over-all quality of refined or purified phthalic anhydride, particularly from ortho-xylene derived sources, with reduced formation of tars and with excellent refinery yields. Distillations run smoothly and reflux ratios can be lowered in many cases, for instance, to 3/1 or 1/1, or, in some cases, even to 1/2 without adverse effect on the quality of the purified phthalic anhydride obtained. In addition to the quality values shown in the foregoing tables, 24 hour ultraviolet (Weather-O-Meter) tests have shown superior ratings (zero—no color change) for purified phthalic anhydrides produced pursuant to the present invention. Additional advantageous features which have been noted are the essential absence of destruction of phthalic anhydride in the treating process, and low viscosities of the residues.

What we claim as new and desire to protect by Letters Patent of the United States is:

1. A method of purifying crude phthalic anhydride which comprises providing a mixture thereof with from about 0.01% to below 1%, by weight of said anhydride, of an alkali metal borohydride, an alkaline earth metal borohydride or a quaternary ammonium borohydride corresponding to the formula $(R_4)\equiv N$ where R are the same or different hydrocarbon radicals selected from the group consisting of methyl, ethyl, propyl, isopropyl, butyl, isobutyl and cyclohexyl, or an alkali metal hydride or alkaline earth metal hydride, heating said mixture at a temperature above 270 degrees C. for several hours, and then recovering purified phthalic anhydride by distillation.

2. A method of purifying crude phthalic anhydride which comprises providing a mixture thereof with from about 0.01% to below 1%, by weight of said anhydride, of sodium borohydride, heating said mixture at a temperature of about 285 degrees C. under reflux for from about 7 to 10 hours, and then recovering purified phthalic anhydride by distillation under a pressure below atmospheric pressure.

3. A method of purifying crude phthalic anhydride which comprises providing a mixture thereof with from about 0.01% to below 1%, by weight of said anhydride, of calcium hydride, heating said mixture at a temperature of about 285 degrees C. under reflux from about 7 to 10 hours, and then recovering purified phthalic anhydride by distillation under a pressure below atmospheric pressure.

4. A method of purifying crude phthalic anhydride which comprises providing a mixture thereof with from about 0.01% to below 1%, by weight of said anhydride, of (1) an alkali metal borohydride, an alkaline earth metal borohydride, or a quaternary ammonium borohydride corresponding to the formula $(R_4)\equiv N$ where R are the same or different hydrocarbon radicals selected from the group consisting of methyl, ethyl, propyl, isopropyl, butyl, isobutyl and cyclohexyl, or an alkali metal hydride or alkaline earth metal hydride, and a small proportion of (2) at least one member selected from the group of alkali metal and alkaline earth metal hydroxides, carbonates and bicarbonates, heating said mixture at a temperature above 270 degrees C. for several hours, and then recovering purified phthalic anhydride by distillation.

5. A method of purifying crude phthalic anhydride which comprises providing a mixture thereof with from about 0.02% to 0.1% sodium borohydride and from about 0.015% to 0.03% of sodium carbonate, by weight of said anhydride, heating said mixture at a temperature of about 285 degrees C. under reflux or from about 7 to 10 hours, and then recovering purified phthalic anhydride by distillation under a pressure below atmospheric pressure.

6. A method of purifying crude phthalic anhydride which comprises providing said crude phthalic anhydride in molten form to which there is added, by weight of said anhydride, from about 0.01% to below 1% of calcium hydride and from about 0.01% to about 0.05% of sodium carbonate, heating said mixture at a temperature above 270 degrees C. for several hours, and then recovering purified phthalic anhydride by distillation under a pressure below atmospheric pressure.

7. A method of purifying crude phthalic anhydride derived from the vapor phase oxidation of ortho-xylene which comprises providing a mixture of said crude anhydride with from about 0.01% to below 1% of (1) sodium borohydride and from about 0.01% to about 0.05% of (2) at least one member selected from the group of alkali metal hydroxides, carbonates and bicarbonates, and alkaline earth metal hydroxides, carbonates and bicarbonates, by weight of said anhydride, heating said mixture at a temperature above 270 degrees C. under reflux for several hours, and then recovering purified phthalic anhydride by distillation under a pressure below atmospheric pressure.

8. A method in accordance with claim 1, wherein the crude phthalic anhydride is derived from the vapor phase oxidation of ortho-xylene and mixtures of ortho-xylene and naphthalene.

No references cited.

NICHOLAS S. RIZZO, *Primary Examiner.*